US011928207B2

(12) United States Patent
Mazumder et al.

(10) Patent No.: US 11,928,207 B2
(45) Date of Patent: Mar. 12, 2024

(54) AUTOMATIC GRAPH-BASED DETECTION OF POTENTIAL SECURITY THREATS

(71) Applicant: Microsoft Technology Licensing, LLC, Redmond, WA (US)

(72) Inventors: Anisha Mazumder, Redmond, WA (US); Haijun Zhai, Bothell, WA (US); Daniel Lee Mace, Bellevue, WA (US); Yogesh K. Roy, Redmond, WA (US); Seetharaman Harikrishnan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 17/520,594

(22) Filed: Nov. 5, 2021

(65) Prior Publication Data

US 2023/0102103 A1 Mar. 30, 2023

Related U.S. Application Data

(60) Provisional application No. 63/248,390, filed on Sep. 24, 2021.

(51) Int. Cl.
*G06F 21/55* (2013.01)
*G06N 3/08* (2023.01)
(52) U.S. Cl.
CPC .............. *G06F 21/55* (2013.01); *G06N 3/08* (2013.01); *G06F 2221/034* (2013.01)
(58) Field of Classification Search
CPC .. G06F 21/55; G06F 2221/034; G06F 21/577; G06F 18/24155; G06N 3/08;

(Continued)

(56) References Cited

U.S. PATENT DOCUMENTS 9,537,884 B1 * 1/2017 Raugas ............... H04L 63/1433
11,194,910 B2 12/2021 Mazumder et al.
(Continued)

OTHER PUBLICATIONS

Wang et al., "Discrete Dynamic Bayesian Network Threat Assessment Method Based on Cloud Parameter Learning," 2019 IEEE International Conference on Signal, Information and Data Processing (ICSIDP) Year: 2019 | Conference Paper | Publisher: IEEE.*

(Continued)

*Primary Examiner* — Roderick Tolentino
(74) *Attorney, Agent, or Firm* — Wade IP Law PLLC

(57) ABSTRACT

Techniques are described herein that are capable of performing automatic graph-based detection of potential security threats. A Bayesian network is initialized using an association graph to establish connections among network nodes in the Bayesian network. The network nodes are grouped among clusters that correspond to respective intents. Patterns in the Bayesian network are identified. At least one redundant connection, which is redundant with regard to one or more other connections, is removed from the patterns. Scores are assigned to the respective patterns in the Bayesian network, based on knowledge of historical patterns and historical security threats, such that each score indicates a likelihood of the respective pattern to indicate a security threat. An output graph is automatically generated. The output graph includes each pattern that has a score that is greater than or equal to a score threshold. Each pattern in the output graph represents a potential security threat.

20 Claims, 6 Drawing Sheets

(58) Field of Classification Search
CPC ............ H04L 63/1416; H04L 63/1425; H04L 63/1433; H04L 63/1408
See application file for complete search history.

(56) References Cited

U.S. PATENT DOCUMENTS

| | | | | |
|---|---|---|---|---|
| 2007/0096896 | A1* | 5/2007 | Zingelewicz | G08B 31/00 340/522 |
| 2011/0154117 | A1* | 6/2011 | Danielson | G06F 11/321 715/764 |
| 2015/0310195 | A1* | 10/2015 | Bailor | G06F 21/45 726/6 |
| 2015/0341379 | A1* | 11/2015 | Lefebvre | H04L 43/0894 726/22 |
| 2017/0230410 | A1* | 8/2017 | Hassanzadeh | G06N 20/00 |
| 2019/0132344 | A1* | 5/2019 | Lem | G06N 20/00 |
| 2022/0004525 | A1* | 1/2022 | Graves, Jr. | G06F 3/065 |
| 2022/0198274 | A1* | 6/2022 | Shindin | G06N 3/084 |
| 2022/0311675 | A1* | 9/2022 | Uskudar | H04L 41/16 |

OTHER PUBLICATIONS

Zhang, Zhengqi, "A Bayesian Network Incremental Algorithm for Public Safety Data Analysis," 2020 5th International Conference on Mechanical, Control and Computer Engineering (ICMCCE) Year: 2020 | Conference Paper | Publisher: IEEE.*
Kobayashi, et al., "Mining Causality of Network Events in Log Data", In IEEE Transactions on Network and Service Management, vol. 15, Issue 1, Mar. 1, 2018, 14 Pages.
"International Search Report and Written Opinion Issued in PCT Application No. PCT/US22/042279", dated Nov. 4, 2022, 13 Pages.
Sun, et al., "Using Bayesian Networks for Probabilistic Identification of Zero-Day Attack Paths", In IEEE Transactions on Information Forensics and Security, vol. 13, Issue 10, Oct. 1, 2018, pp. 2506-2521.

* cited by examiner

AUTOMATIC GRAPH-BASED DETECTION OF POTENTIAL SECURITY THREATS

CROSS-REFERENCE TO RELATED APPLICATION(S)

This application claims the benefit of U.S. Provisional Application No. 63/248,390, filed Sep. 24, 2021 and entitled "Automatic Graph-Based Detection of Potential Security Threats," the entirety of which is incorporated herein by reference.

BACKGROUND

Malicious entities often use multiple assets and resources to execute attacks against targets, such as cloud services and resources. The attacks typically are intended to obtain unauthorized access to the targets and/or cause the targets to execute malicious code. As defense systems become more capable of identifying and mitigating such attacks, the malicious entities typically refine their tools and develop new attack paths. In an effort to identify the new attack paths, security domain experts usually perform a substantial amount of manual work, including manually analyzing data and writing customized queries, which limits the scalability of these conventional techniques.

Some automated techniques have been proposed for defending against malicious attacks. However, each such technique has its limitations. For instance, conventional automated techniques often are noisy. Also, most conventional automated techniques are built on a correlation engine. The correlation engine typically applies hard-coded rules or soft correlations to inform analysis. Maintaining and updating those rules involves substantial effort, which negatively affects efficiency of the conventional automated techniques.

Correlation engines were originally developed for on-premise systems with complete control over single-sourced security logs. Whereas modern cloud systems typically involve multiple solutions, cloud services, and data sources. Accordingly, automated techniques that utilize a correlation engine may not be comprehensively intelligent enough to detect attack patterns, especially considering the complexity and breadth of many newer attack patterns.

SUMMARY

Various approaches are described herein for, among other things, performing automatic graph-based detection of potential security threats. Graph-based detection of potential security threats utilizes graph(s) to detect the potential security threats. A graph is a mathematical structure that is used to model pairwise relations between objects. The graph includes graph nodes (a.k.a. vertices), and at least some pairs of the graph nodes are connected by respective edges (a.k.a. links). For instance, a first edge may connect graph nodes A and B; a second edge may connect graph nodes B and C; and a third edge may connect graph nodes C and A. A graph node may be connected to any one or more other graph nodes by one or more respective edges. A potential security threat may be a potential negative (e.g., malicious) action or event that is facilitated by a vulnerability and that is configured to result in an unwanted impact to a computing system.

In an example approach of performing automatic graph-based detection of potential security threats, a Bayesian network is initialized using an association graph, based on (e.g., based at least in part on) correlations among graph nodes that are included in the association graph, to establish connections among network nodes that are included in the Bayesian network. The network nodes of the Bayesian network are grouped among clusters that correspond to respective intents such that, for each connection between a respective pair of network nodes, which includes an arbitrary network node and a network node that is included in a cluster, a connection between the arbitrary network node and each of the other network nodes that are included in that cluster is created. Patterns in the Bayesian network are identified. Each pattern includes at least one connection. Each connection is between a respective pair of network nodes. At least one redundant connection, which is redundant with regard to one or more other connections, is removed from the patterns in the Bayesian network. Scores are assigned to the respective patterns in the Bayesian network, based on knowledge of historical patterns and historical security threats, such that each score indicates a likelihood of the respective pattern to indicate a security threat. An output graph is automatically generated. The output graph includes each pattern that has a score that is greater than or equal to a score threshold and does not include each pattern that has a score that is less than the score threshold. Each pattern in the output graph represents a potential security threat.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
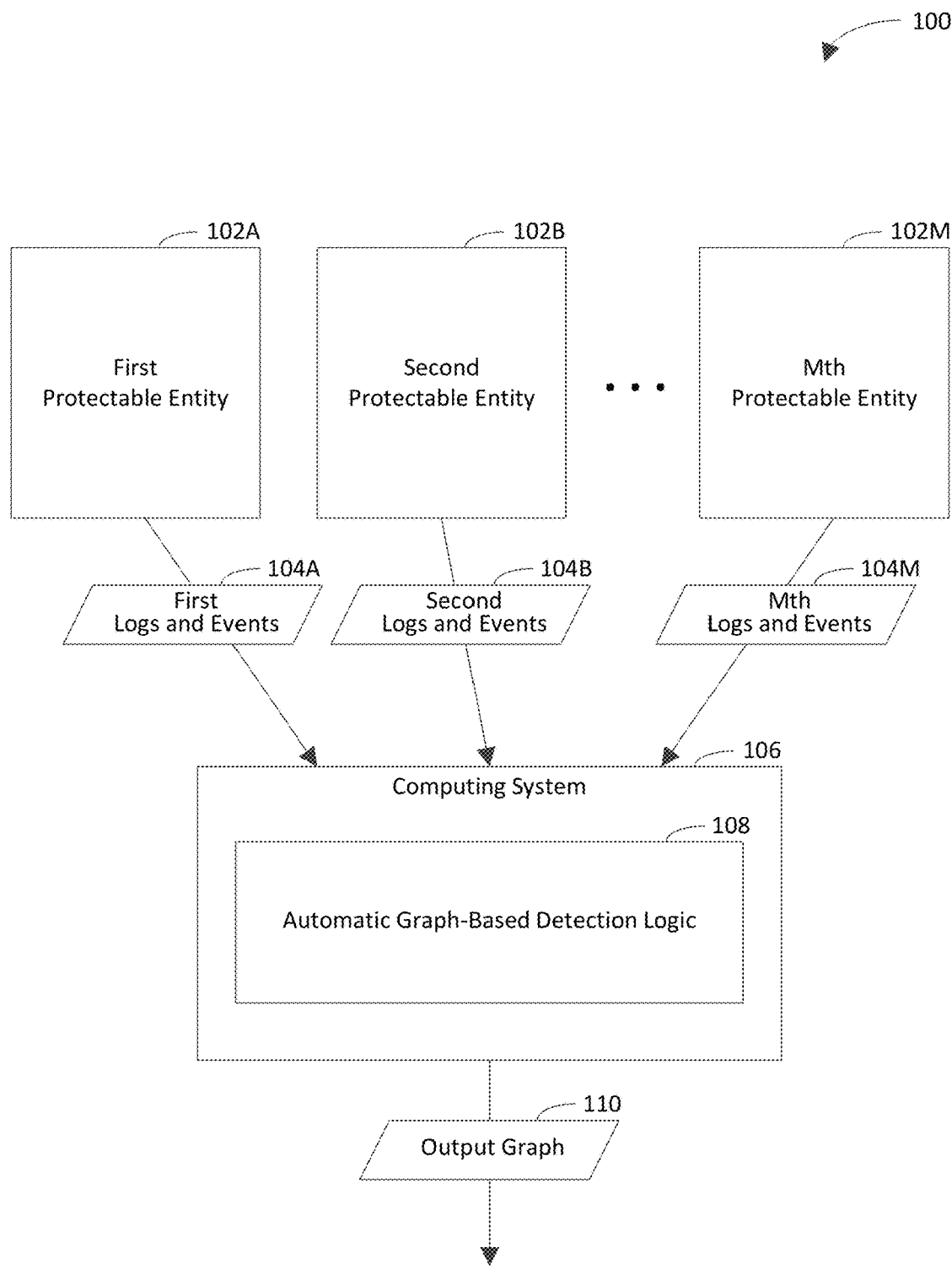
FIG. 1 is a block diagram of an example automatic graph-based detection system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of performing automatic graph-based detection of potential security threats. Graph-based detection of potential security threats utilizes graph(s) to detect the potential security threats. A graph is a mathematical structure that is used to model pairwise relations between objects. The graph includes graph nodes (a.k.a. vertices), and at least some pairs of the graph nodes are connected by respective edges (a.k.a. links). For instance, a first edge may connect graph nodes A and B; a second edge may connect graph nodes B and C; and a third edge may connect graph nodes C and A. A graph node may be connected to any one or more other graph nodes by one or more respective edges. A potential security threat may be a potential negative (e.g., malicious) action or event that is facilitated by a vulnerability and that is configured to result in an unwanted impact to a computing system.

Example techniques described herein have a variety of benefits as compared to conventional techniques for detecting potential security threats. For instance, the example techniques may be capable of automatically detecting potential security threats with less noise and/or with greater speed, efficiency, reliability, and/or effectiveness than the conventional techniques. The example techniques may be capable of more accurately and/or precisely detecting potential security threats. The example techniques may be more scalable than the conventional techniques. Each operation (e.g., unsupervised learning, statistical testing, causal inference, clustering, supervised classification, utilizing manually generated rules) that is performed with regard to a Bayesian network in accordance with any of the example techniques described herein may be performed independently from the other operations, which may increase flexibility of the example techniques and may enable the example techniques to be easily improved by adding new operations. Accordingly, the example techniques may provide a modular solution for detecting potential security threats. Various machine learning algorithms may be applied to each graph operation.

The example techniques may reduce an amount of time and/or assets (e.g., processor, memory, network bandwidth) that are consumed to detect potential security threats and/or to respond to (e.g., mitigate) negative impacts that result from the potential security threats. For example, by using graph(s) to automatically detect potential security threats, an amount of time and/or assets consumed to detect the potential security threats and/or to respond to the negative impacts that result from those potential security threats may be reduced. For instance, the example techniques may prevent the negative impacts of the potential security threats from occurring in which case the amount of time and/or assets consumed to respond to the negative impacts may be avoided.

By inhibiting the negative impacts of the potential security threats from occurring, the example techniques may improve (e.g., increase) a user experience of a user whose computing device or account is affected by the potential security threats, increase efficiency of the user, and/or reduce a cost associated with detecting the potential security threats and responding to the corresponding negative impacts.

FIG. 1 is a block diagram of an example automatic graph-based detection system 100 in accordance with an embodiment. Generally speaking, the automatic graph-based detection system 100 operates to perform automatic graph-based detection of potential security threats. As shown in FIG. 1, the automatic graph-based detection system 100 includes a plurality of protectable entities 102A-102M and a computing system 106. Each of the protectable entities 102A-102M may be a processing system, an application, a service, a client, a user (e.g., a user ID), or any entity that possesses sensitive, proprietary, and/or important information. An example of a processing system is a system that includes at least one processor that is capable of manipulating data in accordance with a set of instructions. For instance, a processing system may be a computer, a personal digital assistant, a cellular telephone, an Internet of things (IoT) device, etc. Examples of a computer include but are not limited to a desktop computer, a laptop computer, a tablet computer, a wearable computer (e.g., a smart watch or a head-mounted computer), a server computer (e.g., a web server, a file server, or a print server), and a client computer.

The protectable entities 102A-102M are configured to generate logs (a.k.a. log data) and/or events (e.g., security alerts). For instance, a first protectable entity 102A is shown to generate first logs and events 104A; a second protectable entity 102B is shown to generate second logs and events 104B; and an Mth protectable entity 102M is shown to generate Mth logs and events 104M. A log that is generated by a protectable entity includes multiple log entries such that each log entry indicates an action that is performed with regard to the protectable entity. For instance, a log entry may indicate an action that is performed on the protectable entity or by the protectable entity. For example, the log entry may indicate a request that is received by the protectable entity, data accessed by the protectable entity in response to the request, and/or an operation performed on the data by the protectable entity. An event that is generated by a protectable entity indicates an occurrence that is encountered by the protectable entity. For example, an event may be in the form of a security alert. A security alert that is generated by a protectable entity indicates an occurrence that potentially negatively impacts security of the protectable entity. For instance, the protectable entity may identify the occurrence using a security alert based on a confidence that the event is to result in a negative impact to the security of the protectable entity being greater than or equal to a confidence threshold and/or as a result of an estimated severity (e.g., estimated extent) of the negative impact being greater than or equal to a severity threshold.

The computing system 106 is a processing system that is configured to receive the logs and events 104A-104M from the protectable entities 102A-102M. The computing system 106 may be a physical processing system or a virtual processing system. The computing system 106 may host any one or more of the protectable entities 102A-102M, though the scope of the example embodiments is not limited in this respect. In one example, the computing system 106 may be connected to any one or more of the protectable entities 102A-102M via a network. For instance, communication between the protectable entities 102A-102M and the computing system 106 may be carried out over the network using well-known network communication protocols. The network may be a wide-area network (e.g., the Internet), a local area network (LAN), another type of network, or a combination thereof. In another example, the computing system 106 may be connected to any one or more of the protectable entities 102A-102M via a direct connection (e.g., and not via a network). In yet another example, the computing system 106 may not be connected to one or more of the protectable entities 102A-102M. In an aspect of this example, a protectable entity may store its logs and/or events in a storage that is external to the protectable entity, and the computing system 106 may be connected to the storage (e.g., without being connected to the protectable entity). In another aspect of this example, an intermediary may obtain logs and/or events from a protectable entity, and the computing system 106 may be connected to the intermediary in order to obtain the logs and/or events.

As shown in FIG. 1, the computing system 106 includes automatic graph-based detection logic 108, which is configured to perform automatic graph-based detection of potential security threats. The automatic graph-based detection logic 108 analyzes the logs and events 104A-104M, which are obtained directly or indirectly from the protectable entities 102A-102M, to detect the security threats. For instance, the automatic graph-based detection logic 108 may retrieve the logs and events 104A-104M from the protectable entities 102A-102M, from storage associated with the protectable entities 102A-102M, or from an intermediary that obtains the logs and events 104A-104M from the protectable entities 102A-102M. For example, the automatic graph-based detection logic 108 may retrieve the logs and events 104A-104M directly from the protectable entities 102A-102M by intercepting the logs and events 104A-104M from the protectable entities 102A-102M in real-time.

The automatic graph-based detection logic 108 generates an association graph based on (e.g., based at least in part on) the logs and events 104A-104M. The automatic graph-based detection logic 108 initializes a Bayesian network using the association graph, based on correlations among graph nodes that are included in the association graph, to establish connections among network nodes that are included in the Bayesian network. The automatic graph-based detection logic 108 groups the network nodes of the Bayesian network among clusters that correspond to respective intents such that, for each connection between a respective pair of network nodes, which includes an arbitrary network node and a network node that is included in a cluster, a connection between the arbitrary network node and each of the other network nodes that are included in that cluster is created. The automatic graph-based detection logic 108 identifies patterns in the Bayesian network. Each pattern includes at least one connection. Each connection is between a respective pair of network nodes. The automatic graph-based detection logic 108 removes at least one redundant connection, which is redundant with regard to one or more other connections, from the patterns in the Bayesian network. The automatic graph-based detection logic 108 assigns scores to the respective patterns in the Bayesian network, based on knowledge of historical patterns and historical security threats, such that each score indicates a likelihood of the respective pattern to indicate a security threat. The automatic graph-based detection logic 108 automatically generates an output graph. The output graph includes each pattern that has a score that is greater than or equal to a score threshold. The output graph does not include each pattern that has a score that is less than the score threshold. Each pattern in the output graph represents a potential security threat.

The automatic graph-based detection logic 108 may include or be incorporated into security information and event management (SIEM) logic. STEM logic is configured to perform security information management (SIM) and security event management (SEM) to provide real-time analysis of security alerts generated by applications and network hardware. For instance, SIM may be used to provide long-term storage, analysis (e.g., trend analysis), and reporting of log data. SIM may be used to store the log data in a central repository. SEM may be used to provide real-time monitoring and correlation of events, notifications, and console views. It will be recognized that the example techniques described herein may be implemented using SIEM logic.

The automatic graph-based detection logic 108 may use machine learning (ML) to perform any one or more of its operations. For instance, the automatic graph-based detection logic 108 may use the machine learning to develop and refine the clusters among which the network nodes of the Bayesian network are grouped, the patterns that are identified in the Bayesian network, the scores that are assigned to the respective patterns in the Bayesian network, and/or the output graph. For example, the automatic graph-based detection logic 108 may use the machine learning to analyze the network nodes of the Bayesian network to identify the intents associated with respective subsets of the network nodes. In accordance with this example, the automatic graph-based detection logic 108 may then group the network nodes associated with each intent into a respective cluster. In another example, the automatic graph-based detection logic 108 may use the machine learning to analyze the network nodes of the Bayesian network to identify the patterns among the network nodes. In yet another example, the automatic graph-based detection logic 108 may use the machine learning to analyze historical information, which indicates the historical patterns and the historical security threats, to derive the scores that are to be assigned to the respective patterns in the Bayesian network. In still another example, the automatic graph-based detection logic 108 may use the machine learning to analyze the patterns and the scores to generate the output graph. In accordance with this example, the automatic graph-based detection logic 108 may use the machine learning to establish the score threshold against which the scores of the respective patterns in the Bayesian network are compared for purposes of generating the output graph.

The automatic graph-based detection logic 108 may use a neural network to perform the machine learning to predict the intents associated with the respective subsets of the network nodes (and the corresponding clusters), the patterns among the network nodes in the Bayesian network, the scores that are to be assigned to the respective patterns in the Bayesian network, and/or the score threshold against which the scores are compared. The automatic graph-based detection logic 108 may use the predicted intents, patterns, scores, and/or score threshold to generate the output graph. Examples of a neural network include but are not limited to a feed forward neural network and a long short-term memory (LSTM) neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the automatic graph-based detection logic 108 employs a feed forward neural network to train a machine learning model that is used to determine ML-based confidences. Such ML-based confidences may be used to determine likelihoods that events will occur.

An LSTM neural network is a recurrent neural network that has memory and allows data to flow forward and backward in the neural network. The LSTM neural network is capable of remembering values for short time periods or long time periods. Accordingly, the LSTM neural network may keep stored values from being iteratively diluted over time. In one example, the LSTM neural network may be capable of storing information, such as historical intents, patterns, scores, score thresholds, and security threats over time. For instance, the LSTM neural network may generate the output graph by utilizing such information. In another example, the LSTM neural network may be capable of remembering relationships between features, such as events that are represented by the network nodes of the Bayesian network, sequences (e.g., temporal sequences) of such events, entities associated with such events, probabilities that such events, sequences, and/or entities correspond to a potential security threat, and ML-based confidences that are derived therefrom.

The automatic graph-based detection logic 108 may include training logic and inference logic. The training logic is configured to train a machine learning algorithm that the inference logic uses to determine (e.g., infer) the ML-based confidences. For instance, the training logic may provide sample events, sample sequences of the sample events, sample entities associated with the sample events, sample probabilities that the sample events, sample sequences, and/or sample entities correspond to a potential security threat, and sample confidences as inputs to the algorithm to train the algorithm. The sample data may be labeled. The machine learning algorithm may be configured to derive relationships between the features (e.g., events, sequences, entities, and probabilities that the events, sequences, and/or entities correspond to a potential security threat) and the resulting ML-based confidences. The inference logic is configured to utilize the machine learning algorithm, which is trained by the training logic, to determine the ML-based confidence when the features are provided as inputs to the algorithm.

The automatic graph-based detection logic 108 may be implemented in various ways to perform automatic graph-based detection of potential security threats, including being implemented in hardware, software, firmware, or any combination thereof. For example, the automatic graph-based detection logic 108 may be implemented as computer program code configured to be executed in one or more processors. In another example, at least a portion of the automatic graph-based detection logic 108 may be implemented as hardware logic/electrical circuitry. For instance, at least a portion of the automatic graph-based detection logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

The automatic graph-based detection logic 108 may be partially or entirely incorporated in a SIEM program, though the example embodiments are not limited in this respect.

Figure 2:
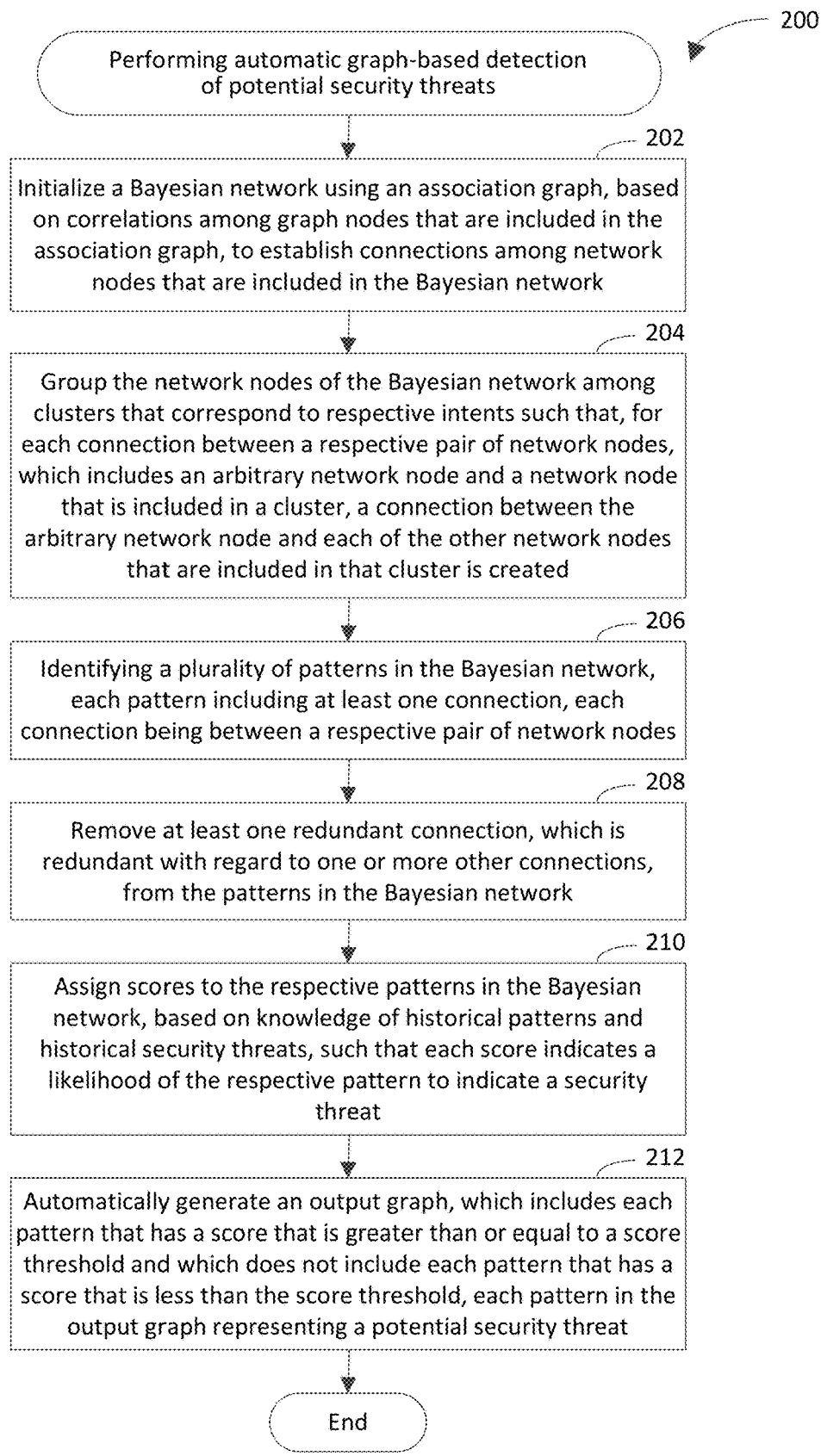
FIG. 2 depicts a flowchart of an example method for performing automatic graph-based detection of potential security threats in accordance with an embodiment.
Figure 3:
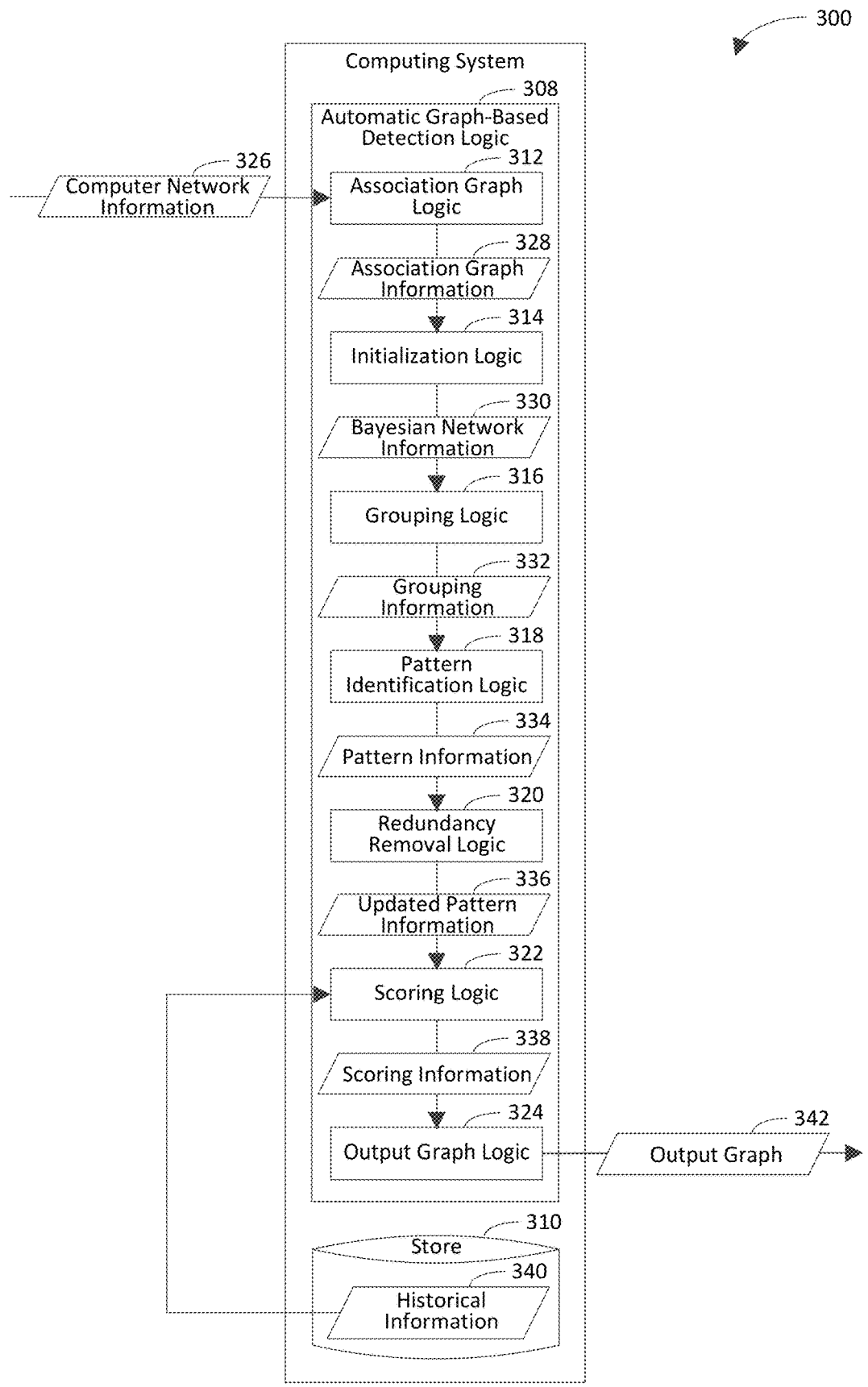
FIG. 3 is a block diagram of an example computing system in accordance with an embodiment.

FIG. 2 depicts a flowchart 200 of an example method for performing automatic graph-based detection of potential security threats in accordance with an embodiment. Flowchart 200 may be performed by the computing system 106 shown in FIG. 1, for example. For illustrative purposes, flowchart 200 is described with respect to computing system 300 shown in FIG. 3, which is an example implementation of the computing system 106. As shown in FIG. 3, the computing system 300 includes automatic graph-based detection logic 308 and a store 310. The automatic graph-based detection logic 308 includes association graph logic 312, initialization logic 314, grouping logic 316, pattern identification logic 318, redundancy removal logic 320, scoring logic 322, and output graph logic 324. The store 310 may be any suitable type of store. One type of store is a database. For instance, the store 310 may be a relational database, an entity-relationship database, an object database, an object relational database, an extensible markup language (XML) database, etc. The store 310 is shown to store historical information 340 for non-limiting illustrative purposes. Further structural and operational embodiments will be apparent to persons skilled in the relevant art(s) based on the discussion regarding flowchart 200.

As shown in FIG. 2, the method of flowchart 200 begins at step 202. In step 202, a Bayesian network is initialized using an association graph, based on correlations among graph nodes that are included in the association graph, to establish connections among network nodes that are included in the Bayesian network. In an example implementation, the initialization logic 314 initializes the Bayesian network using the association graph. For example, the initialization logic 314 may receive association graph information 328, which identifies the graph nodes and the correlations among the graph nodes. In accordance with this example, the initialization logic 314 may analyze the association graph information to determine the graph nodes and the correlations among the graph nodes. In further accordance with this example, the initialization logic 314 may initialize the Bayesian network based on the graph nodes and the correlations that are identified by the association graph information 328. The initialization logic 314 may generate Bayesian network information 330, which indicates (e.g., identifies) the network nodes of the Bayesian network and the connections among the network nodes.

In an example embodiment, the Bayesian network is initialized at step 202 using the association graph based on pairwise correlations among the graph nodes that are included in the association graph.

In another example embodiment, the Bayesian network is initialized at step 202 by performing a test of significance on the association graph to identify the correlations among the graph nodes in the association graph. A test of significance compares observed data with a hypothesis to determine whether the hypothesis is true. For example, the hypothesis may be that correlations exists between some pairs of graph nodes in the association graph and do not exist between other pairs of graph nodes in the association graph. In accordance with this example, the test of significance may determine likelihoods that observed relationships between some pairs of graph nodes constitute actual correlations and likelihoods that absence of observed relationships between other pairs of graph nodes constitute absence of actual correlations. In further accordance with this example, the test of significance may identify the correlations among the graph nodes based on the likelihood associated with each pair of graph nodes. For instance, a likelihood that is greater than or equal to a likelihood threshold may indicate existence of a correlation between the respective pair of graph nodes. A likelihood that is less than the likelihood threshold may indicate that a correlation between the respective pair of graph nodes does not exist.

In yet another example embodiment, initializing the Bayesian network at step 202 includes assigning a weight to each pair of network nodes in the Bayesian network. Each weight represents an extent to which the network nodes in the respective pair are related. For instance, each weight may indicate a confidence that the network nodes in the respective pair are related. In an example, each weight may be calculated using the expression $\log\{1+P(A_iA_j)/[P(A_i)P(A_j)]\}$, where $P(A_i)$ is a probability of a first network node that is included in the respective pair, $P(A_j)$ is a probability of a second network node that is included in the respective pair, and $P(A_iA_j)$ is a probability of a combination of the first and second network nodes. In accordance with this embodiment, initializing the Bayesian network at step 202 further includes removing a connection between each pair of network nodes in the Bayesian network that has a weight that is less than or equal to a weight threshold.

In still another example embodiment, each graph node of the association graph represents an entity from a plurality of entities or an event from a plurality of events. Examples of an entity include but are not limited to a user, an internet protocol (IP) address, an alert, a host (e.g., client host), a virtual machine (VM), a file, a cloud subscription, and a domain controller. Examples of an event include but are not limited to an operation failure, crypto-mining activity, atypical travel, a login attempt, an unfamiliar location (e.g., domain) of a computing device (e.g., computing device that attempted to login or computing device from which information is downloaded or attempted to be downloaded), a number of files downloaded is greater than or equal to a threshold, a cumulative size of files downloaded is greater than or equal to a threshold, and a number of accounts that are enumerated is greater than or equal to a threshold. In accordance with this embodiment, each network node of the Bayesian network represents an event from the plurality of events. For instance, each network node may indicate an event name, a provider, and/or a join type associated with the event. A join type may indicate that the corresponding event is joined by (i.e., associated with) a user, a host, an IP address, and so on.

At step 204, the network nodes of the Bayesian network are grouped among clusters that correspond to respective intents such that, for each connection between a respective pair of network nodes, which includes an arbitrary network node and a network node that is included in a cluster, a connection between the arbitrary network node and each of the other network nodes that are included in that cluster is created. For instance, each network node of the Bayesian network may be grouped into a single cluster. Examples of an intent include but are not limited to attempting to access file(s) maliciously, attempting to access file(s) legitimately, uploading file(s), and partitioning memory. In an example, the network nodes of the Bayesian network may be grouped among the clusters using an unsupervised clustering algorithm. In another example, the network nodes of the Bayesian network may be grouped among the clusters using a supervised clustering algorithm.

In an example implementation, grouping logic 316 groups the network nodes of the Bayesian network among the clusters that correspond to respective intents. For example, the grouping logic 316 may analyze the Bayesian network information 330, which indicates the network nodes of the Bayesian network and the connections among the network nodes, to determine the intent that is associated with each connection. For instance, the grouping logic 316 may assign probabilities for the respective intents to each connection in the Bayesian network such that each probability indicates a confidence that the respective intent is to be associated with the connection. The grouping logic 316 may identify the intent associated with each connection to be the intent having a confidence that is no less than (e.g., is greater than) confidences of the other intents with regard to the connection. In accordance with this example, the grouping logic 316 may group the network nodes having connections that are associated with each intent into a respective cluster. For instance, the grouping logic 316 may group network nodes having connections that are associated with a first intent into a first cluster; the grouping logic 316 may group network nodes having connections that are associated with a second intent into a second cluster, and so on. In further accordance with this implementation, for each connection between a respective pair of network nodes, which includes an arbitrary network node and a network node that is included in a cluster, the grouping logic 316 creates a connection between the arbitrary network node and each of the other network nodes that are included in that cluster. Accordingly, the grouping logic 316 may create the connections to the other network nodes based on the grouping. The grouping logic 316 may generate grouping information 332 to indicate the network nodes of the Bayesian network, the cluster in which each network node is grouped, and/or the connections among the network nodes.

In an example embodiment in which each network node of the Bayesian network represents an event from a plurality of events, the events represented by the network nodes in each cluster are configured to achieve the intent with which the cluster corresponds. An example implementation will now be described for non-limiting, illustrative purposes. In this implementation, assume that the Bayesian network includes network nodes A-K. Network node A may represent "atypical travel." Network node B may represent "unfamiliar sign-in properties." Network node C may represent "user and IP address reconnaissance (SMB)." Network node D may represent "network mapping reconnaissance (DNS)."

Network node E may represent "user and group membership reconnaissance (SAMR)." Network node F may represent "new group add suspiciously." Network node G may represent "an uncommon file was created and added to startup folder." Network node H may represent "fake Windows binary set to autostart." Network node I may represent "Sticky Keys binary hijack detected." Network node J may represent "user account created under suspicious circumstances." Network node K may represent "new local admin added using Net commands." Network nodes A and B may be grouped in a first cluster based on nodes A and B corresponding to an intent of "exploitation." Network nodes C-E may be grouped in a second cluster based on nodes C-E corresponding to an intent of "discovery." Network nodes F-K may be grouped in a third cluster based on nodes F-K corresponding to an intent of "persistence."

At step 206, a plurality of patterns in the Bayesian network are identified. Each pattern includes at least one connection. Each connection is between a respective pair of network nodes. In an example embodiment, each pattern may represent a respective sequence of connections. In an example embodiment in which each network node of the Bayesian network represents an event from a plurality of events, each pattern may represent a respective sequence of events. In an example implementation, the pattern identification logic 318 identifies the patterns in the Bayesian network. For example, the pattern identification logic 318 may analyze the grouping information 332 to identify the patterns. In accordance with this example, the pattern identification logic 318 may review the connections among the network nodes, as indicated by the grouping information 332, to identify the patterns. The pattern identification logic 318 may generate pattern information 334, which indicates the plurality of patterns in the Bayesian network. The pattern information 334 may further indicate the network nodes of the Bayesian network, the cluster in which each network node is grouped, and/or the connections among the network nodes.

In an example embodiment, identifying the plurality of patterns at step 206 includes automatically identifying a first subset of the plurality of patterns using a machine learning technique. In accordance with this embodiment, identifying the plurality of patterns at step 206 further includes identifying a second subset of the plurality of patterns using a manually generated rule (e.g., based on each pattern in the second subset not being automatically identified by using the machine learning technique). For instance, the manually generated rule may be a human-generated rule. One example of a manually generated rule may specify that a designated network node joined by a domain controller is not suspicious, whereas the designated network node joined by a client host is suspicious. When a request is sent to the domain controller, the domain controller forwards the request to a client host. Thus, the network node being joined by the domain controller may not indicate that the domain controller has been compromised. An algorithm used in the machine learning technique may not be capable of learning this distinction, and the manually generated rule may be used to ensure that the distinction is made. In further accordance with this embodiment, the first subset includes at least one pattern from the plurality of patterns, and the second subset includes at least one pattern from the plurality of patterns.

At step 208, at least one redundant connection, which is redundant with regard to one or more other connections, is removed from the patterns in the Bayesian network. In an example implementation, the redundancy removal logic 320 may remove at least one redundant connection from the patterns in the Bayesian network. For example, the redundancy removal logic 320 may analyze the pattern information 334 to identify the connections among the network nodes and the plurality of patterns in the Bayesian network. The redundancy removal logic 320 may compare each connection with other connection(s) to determine whether each connection is redundant with regard to any one or more of the other connection(s). In accordance with this example, the redundancy removal logic 320 may remove from the patterns, which are indicated by the pattern information 334, each connection that is determined to be redundant with regard to one or more other connections. The redundancy removal logic 320 may generate updated pattern information 336, which indicates the plurality of patterns in the Bayesian network as revised to exclude the redundant connection(s). The pattern information 334 may further indicate the network nodes of the Bayesian network, the cluster in which each network node is grouped, and/or the non-redundant connections among the network nodes.

In an example embodiment, removing the at least one redundant connection at step 208 includes removing a first connection, which is between a first network node and a second network node, from the patterns in the Bayesian network based on the first connection being redundant with regard to a second connection, which is between the first network node and a third network node, and a third connection, which is between the third network node and the second network node. For instance, the first connection may be removed from the patterns based on the first connection linking the first network node and the second network node and a combination of the second and third connections also linking the first network node and the second network node.

In another example embodiment, removing the at least one redundant connection at step 208 includes removing a first connection, which is between a first network node and a second network node, from the patterns in the Bayesian network based on the first connection being redundant with regard to a second connection, which is between the first network node and a third network node, as a result of the second network node and the third network node being in a same cluster. For instance, the second network node and the third network node may be deemed to be equivalent as a result of the second network node and the third network node being in the same cluster.

At step 210, scores are assigned to the respective patterns in the Bayesian network, based on knowledge of historical patterns and historical security threats, such that each score indicates a likelihood of the respective pattern to indicate a security threat. For instance, the likelihood of a pattern to indicate a security threat may be based on an extent to which the pattern corresponds to (e.g., matches) a historical pattern that corresponds to a historical security threat, a number of historical patterns with which the pattern corresponds that correspond to a historical security threat, an extent to which the pattern corresponds to a historical pattern that does not correspond to a historical security threat, and/or a number of historical patterns with which the pattern corresponds that do not correspond to a historical security threat. In an example, the historical patterns and the historical security threats may be those that have been identified within a specified period of time or that have occurred within the specified period of time. In accordance with this example, the specified period of time may be a 20-day time period that ends with a current time, a 30-day time period that ends with the current time, or a 60-day time period that ends with the current time.

In an example implementation, the scoring logic 322 assigns the scores to the respective patterns in the Bayesian network based on historical information 340, which indicates the historical patterns and the historical security threats. For instance, the scoring logic 322 may retrieve the historical information 340 from the store 310 for purposes of determining the scores to be assigned to the respective patterns. The scoring logic 322 may generate scoring information 338, which indicates the plurality of patterns in the Bayesian network (as revised to exclude the redundant connection(s)) and the scores that are assigned to the respective patterns. For instance, the scoring information 338 may cross-reference the patterns to the corresponding scores. The scoring information 338 may further indicate the network nodes of the Bayesian network, the cluster in which each network node is grouped, and/or the non-redundant connections among the network nodes.

In an example embodiment, assigning the scores to the respective patterns in the Bayesian network at step 210 is performed using a classifier that is trained using features that are derived from labeled data. Accordingly, the scores may be assigned using supervised classification. The labeled data represents the knowledge of the historical patterns and the historical security threats. For instance, the labeled data may indicate known attack patterns, user feedback, and/or manually generated labels. The known attack patterns may include patterns that have been previously flagged as representing potential security threats. The user feedback may include impressions (e.g., opinions) of users regarding the historical patterns (e.g., whether one or more of the historical patterns correspond to one or more of the historical security threats). For example, a pattern that is known to be non-threatening or that has affected relatively few (e.g., one or two) computing devices may be assigned a relatively low score (e.g., a score of zero); whereas a pattern that is known to represent a potential security threat or that has affected a substantial number of computing devices may be assigned a relatively high score.

An example scoring implementation will now be described for non-limiting, illustrative purposes. This implementation involves six patterns, and each pattern includes a single connection for ease of discussion. A first pattern, which includes a connection between a first network node representing "atypical travel" and a second network node representing "suspicious inbox manipulation rule," is assigned a score of 0.8. A second pattern, which includes a connection between the first network node and a third network node representing "network communication with a malicious machine detected," is assigned a score of 0.71. A third pattern, which includes a connection between the first network node and a fourth network node representing "crypto-mining activity," is assigned a score of 0.71. A fourth pattern, which includes a connection between a fifth network node representing "suspected brute-force attack" and a sixth network node representing "suspicious behavior by cmd.exe was observed," is assigned a score of 0.7. A fifth pattern, which includes a connection between a seventh network node representing "filed SSH brute force attack" and an eighth network node representing "executable application control policy violation was audited," is assigned a score of 0.2. A sixth pattern, which includes a connection between a ninth network node representing "connection to a custom network indicator" and a tenth network node representing "credit card number," is assigned a score of 0.19.

At step 212, an output graph is automatically generated. The output graph includes each pattern that has a score that is greater than or equal to a score threshold and does not include each pattern that has a score that is less than the score threshold. Each pattern in the output graph represents a potential security threat. In an example implementation, the output graph logic 324 automatically generates an output graph 342, which includes each pattern that has a score that is greater than or equal to the score threshold and which does not include each pattern that has a score that is less than the score threshold. For instance, the output graph logic 324 may compare the score that is assigned to each pattern and the score threshold to determine whether the respective score is greater than or equal to the score threshold. The output graph logic 324 may aggregate the patterns that have the scores that are greater than or equal to the score threshold to generate the output graph 342.

In the example scoring implementation described above with reference to step 210, the score threshold may be set to equal 0.7 for non-limiting, illustrative purposes. In accordance with this implementation, the output graph may be automatically generated to include the first, second, third, and fourth patterns because their corresponding scores of 0.8, 0.71, 0.71, and 0.7 are greater than or equal to the score threshold of 0.7. The output graph may be automatically generated to not include the fifth and sixth patterns because their corresponding scores of 0.2 and 0.19 are less than the score threshold of 0.7.

In some example embodiments, one or more steps 202, 204, 206, 208, 210, and/or 212 of flowchart 200 may not be performed. Moreover, steps in addition to or in lieu of steps 202, 204, 206, 208, 210, and/or 212 may be performed. For instance, in an example embodiment, the method of flowchart 200 further includes generating the association graph based on information regarding a computer network. The information indicates requests that are received in the computer network, data that are accessed in response to the requests, and/or operations that are performed on the data. In an example implementation, the association graph logic 312 generates the association graph based on computer network information 326, which indicates the requests that are received in the computer network, the data that are accessed in response to the requests, and the operations that are performed on the data. In accordance with this implementation, the association graph logic 312 may generate the association graph information 328 to describe the association graph. For instance, the association graph information 328 may indicate the graph nodes that are included in the association graph and correlations among the graph nodes.

In another example embodiment, the method of flowchart 200 further includes identifying redundant connections among the patterns in the Bayesian network by performing a conditional independence test on the network nodes of the Bayesian network. The conditional independence test is configured to determine whether each network node in the Bayesian network has a causal relation to each other network node in the Bayesian network. Conditional independence is often formulated in terms of conditional probability, which may be expressed using the following inequality: $P(A|B)=P(A \cap B)/P(B)$, where $P(A|B)$ represents the conditional probability of an event A assuming that event B has occurred. In an example implementation, the redundancy removal logic 320 identifies the redundant connections among the patterns in the Bayesian network. In accordance with this embodiment, removing the at least one redundant connection at step 208 is performed as a result of identifying the redundant connections among the patterns in the Bayesian network.

In an aspect of this embodiment, identifying the redundant connections among the patterns in the Bayesian network includes automatically identifying a first subset of the redundant connections using a machine learning technique. In accordance with this aspect, identifying the redundant connections among the patterns in the Bayesian network further includes identifying a second subset of the redundant connections using a manually generated rule (e.g., based on each redundant connection in the second subset not being automatically identified by using the machine learning technique). The first subset includes at least one of the redundant connections, and the second subset includes at least one of the redundant connections.

It will be recognized that the computing system 300 may not include one or more of the automatic graph-based detection logic 308, the store 310, the association graph logic 312, the initialization logic 314, the grouping logic 316, the pattern identification logic 318, the redundancy removal logic 320, the scoring logic 322, and/or the output graph logic 324. Furthermore, the computing system 300 may include components in addition to or in lieu of the automatic graph-based detection logic 308, the store 310, the association graph logic 312, the initialization logic 314, the grouping logic 316, the pattern identification logic 318, the redundancy removal logic 320, the scoring logic 322, and/or the output graph logic 324.

Figure 4:
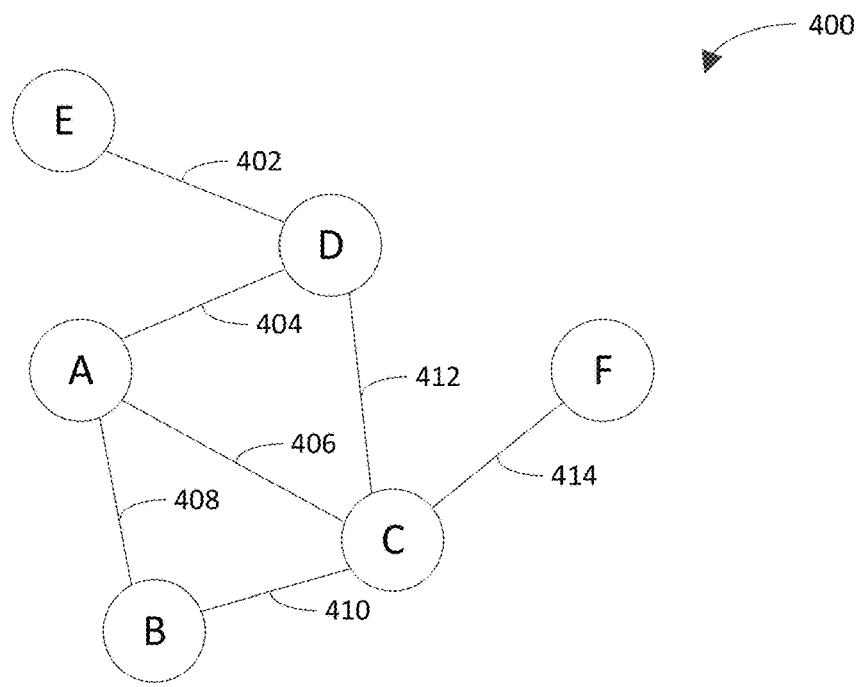
FIGS. 4-6 depict example Bayesian networks in accordance with embodiments.

FIG. 4 depicts an example Bayesian network 400 in accordance with an embodiment. As shown in FIG. 4, the Bayesian network 400 includes network nodes A-F. Network node A is connected to network nodes B, C, and D via respective connections 408, 406, and 404. Network nodes B and C are connected via connection 410. Network nodes C and D are connected via connection 412. Network nodes C and F are connected via connection 414. Network nodes D and E are connected via connection 402.

Figure 5:
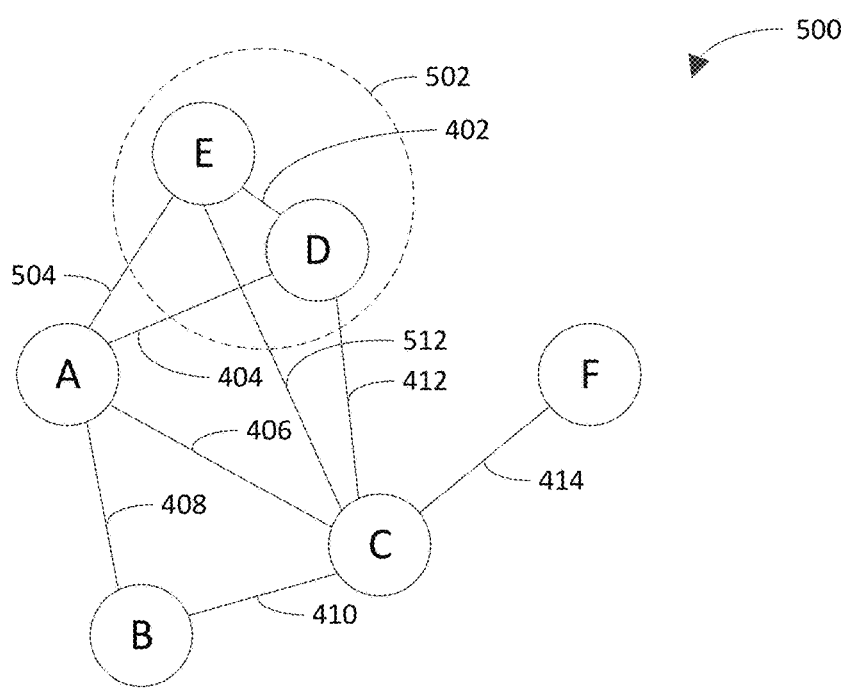

FIG. 5 depicts another example Bayesian network 500 in accordance with an embodiment. The Bayesian network 500 is similar to the Bayesian network 400 shown in FIG. 4, except that network nodes D and E in the Bayesian network 500 have been grouped in a cluster 502. For instance, network nodes D and E may have been grouped into the cluster 502 in accordance with step 204 of flowchart 200 in FIG. 2. Accordingly, the Bayesian network 500 includes network nodes A-F. Network node A is connected to network nodes B, C, and D via respective connections 408, 406, and 404. Network nodes B and C are connected via connection 410. Network nodes C and D are connected via connection 412. Network nodes C and F are connected via connection 414. Network nodes D and E are connected via connection 402.

As a result of the network nodes D and E being grouped in the cluster 502, for each connection between an arbitrary network node and a network node that is included in the cluster 502 (i.e., network node D or E), a connection is created between the arbitrary network node and each of the other network nodes that are included in the cluster 502. For instance, because network node A is connected to network node D (i.e., one of the network nodes in the cluster 502) via connection 404, a connection 504 is established to connect network node A to network node E (i.e., the other network node in the cluster 502). Because network node C is connected to network node D (i.e., one of the network nodes in the cluster 502) via connection 412, a connection 512 is established to connect network node C to network node E (i.e., the other network node in the cluster 502).

Figure 6:
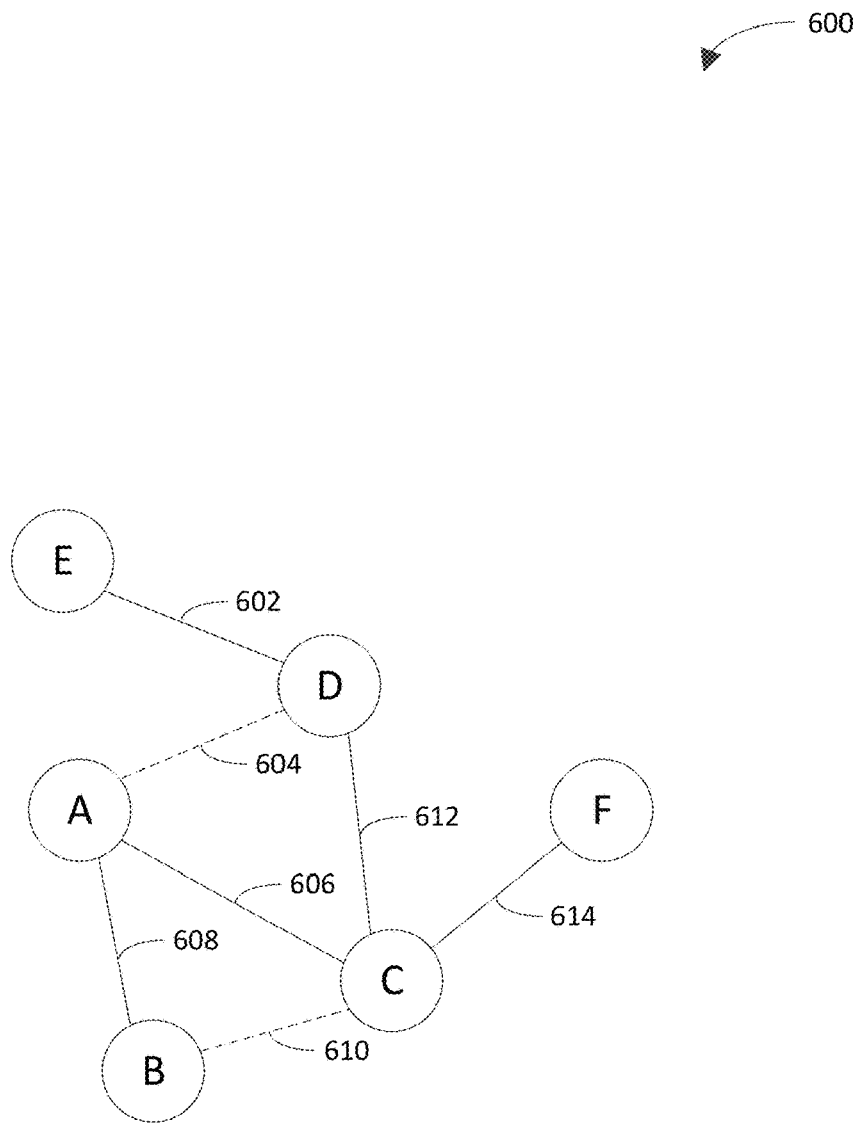

FIG. 6 depicts yet another example Bayesian network 600 in accordance with an embodiment. As shown in FIG. 6, the Bayesian network 600 includes network nodes A-F. Initially, network node A is connected to network nodes B, C, and D via respective connections 608, 606, and 604; network nodes B and C are connected via connection 610; network nodes C and D are connected via connection 612; network nodes C and F are connected via connection 614; and network nodes D and E are connected via connection 602.

However, as indicated by the dashed lines in FIG. 6, connections 604 and 610 have been removed because each of connections 604 and 610 is redundant with regard to one or more other connections. For instance, connections 604 and 610 may have been removed in accordance with step 208 of flowchart 200 in FIG. 2. Connection 604 is redundant with regard to a combination of connection 606 and connection 612 because connection 604 connects network nodes A and D and the combination of connections 606 and 612 connects network nodes A and D. For example, connection 606 connects network nodes A and C, and connection 612 connects network nodes C and D. The combination of connections 606 and 612 therefore connects network nodes A and D. In an aspect, the redundancy of connection 604 may be described using the following equation: $P(A, D|C) = P(A|C)P(D|C)$. Connection 610 is redundant with regard to a combination of connections 608 and 606 because connection 610 connects network nodes B and C and the combination of connections 608 and 606 connects network nodes B and C. For example, connection 608 connects network nodes B and A, and connection 606 connects network nodes A and C. The combination of connections 608 and 606 therefore connects network nodes B and C. In an aspect, the redundancy of connection 610 may be described using the following equation: $P(B, C|A) = P(B|A)P(C|A)$.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the automatic graph-based detection logic 108, the automatic graph-based detection logic 308, the association graph logic 312, the initialization logic 314, the grouping logic 316, the pattern identification logic 318, the redundancy removal logic 320, the scoring logic 322, the output graph logic 324, and/or flowchart 200 may be implemented in hardware, software, firmware, or any combination thereof.

For example, any one or more of the automatic graph-based detection logic 108, the automatic graph-based detection logic 308, the association graph logic 312, the initialization logic 314, the grouping logic 316, the pattern identification logic 318, the redundancy removal logic 320, the scoring logic 322, the output graph logic 324, and/or flowchart 200 may be implemented, at least in part, as computer program code configured to be executed in one or more processors.

In another example, any one or more of the automatic graph-based detection logic 108, the automatic graph-based detection logic 308, the association graph logic 312, the initialization logic 314, the grouping logic 316, the pattern identification logic 318, the redundancy removal logic 320, the scoring logic 322, the output graph logic 324, and/or flowchart 200 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
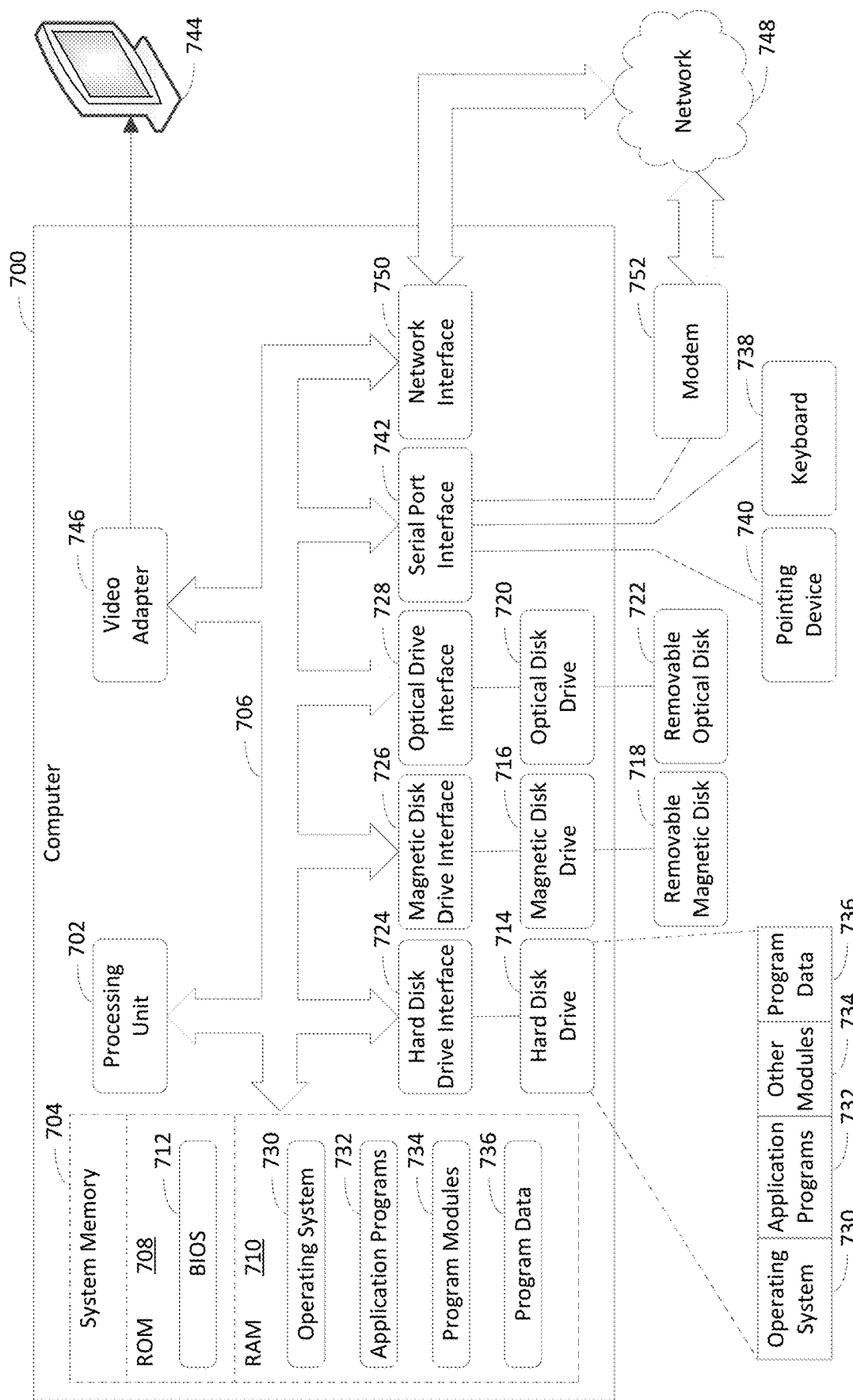
FIG. 7 depicts an example computer in which embodiments may be implemented.

III. Further Discussion of Some Example Embodiments (A1) An example system (FIG. 1, 102A-102M, 106A-106N; FIG. 3, 300; FIG. 7, 700) to perform automatic graph-based detection of potential security threats comprises a memory (FIG. 7, 704, 708, 710) and one or more processors (FIG. 7, 702) coupled to the memory. The one or more processors are configured to initialize (FIG. 2, 202) a Bayesian network using an association graph, based on correlations among graph nodes that are included in the association graph, to establish connections among network nodes that are included in the Bayesian network. The one or more processors are further configured to group (FIG. 2, 204) the network nodes of the Bayesian network among clusters that correspond to respective intents such that, for each connection between a respective pair of network nodes, which includes an arbitrary network node and a network node that is included in a cluster, a connection between the arbitrary network node and each of the other network nodes that are included in that cluster is created. The one or more processors are further configured to identify (FIG. 2, 206) a plurality of patterns in the Bayesian network, each pattern including at least one connection, each connection being between a respective pair of network nodes. The one or more processors are further configured to remove (FIG. 2, 208) at least one redundant connection, which is redundant with regard to one or more other connections, from the patterns in the Bayesian network. The one or more processors are further configured to assign (FIG. 2, 210) scores to the respective patterns in the Bayesian network, based on knowledge of historical patterns and historical security threats, such that each score indicates a likelihood of the respective pattern to indicate a security threat. The one or more processors are further configured to automatically generate (FIG. 2, 212) an output graph (FIG. 3, 342), which includes each pattern that has a score that is greater than or equal to a score threshold and which does not include each pattern that has a score that is less than the score threshold. Each pattern in the output graph represents a potential security threat.

(A2) In the example system of A1, wherein the one or more processors are further configured to generate the association graph based on information regarding a computer network, the information indicating requests that are received in the computer network, data that are accessed in response to the requests, and operations that are performed on the data.

(A3) In the example system of any of A1-A2, wherein the one or more processors are configured to initialize the Bayesian network using the association graph based on pairwise correlations among the graph nodes that are included in the association graph.

(A4) In the example system of any of A1-A3, wherein the one or more processors are configured to initialize the Bayesian network by performing a test of significance on the association graph to identify the correlations among the graph nodes in the association graph.

(A5) In the example system of any of A1-A4, wherein the one or more processors are configured to: assign a weight to each pair of network nodes in the Bayesian network, each weight representing an extent to which the network nodes in the respective pair are related; and remove a connection between each pair of network nodes in the Bayesian network that has a weight that is less than or equal to a weight threshold.

(A6) In the example system of any of A1-A5, wherein each graph node of the association graph represents an entity from a plurality of entities or an event from a plurality of events; and wherein each network node of the Bayesian network represents an event from the plurality of events.

(A7) In the example system of any of A1-A6, wherein the one or more processors are configured to: automatically identify a first subset of the plurality of patterns using a machine learning technique; and identify a second subset of the plurality of patterns using a manually generated rule; and wherein each of the first subset and the second subset includes at least one pattern from the plurality of patterns.

(A8) In the example system of any of A1-A7, wherein the one or more processors are configured to: identify redundant connections among the patterns in the Bayesian network by performing a conditional independence test on the network nodes of the Bayesian network, the conditional independence test configured to determine whether each network node in the Bayesian network has a causal relation to each other network node in the Bayesian network; and remove the at least one redundant connection as a result of identifying the redundant connections among the patterns in the Bayesian network.

(A9) In the example system of any of A1-A8, wherein the one or more processors are configured to: automatically identify a first subset of the redundant connections using a machine learning technique; and identify a second subset of the redundant connections using a manually generated rule; and wherein each of the first subset and the second subset includes at least one of the redundant connections.

(A10) In the example system of any of A1-A9, wherein the one or more processors are configured to remove a first connection, which is between a first network node and a second network node, from the patterns in the Bayesian network based on the first connection being redundant with regard to a second connection, which is between the first network node and a third network node, as a result of the second network node and the third network node being equivalent.

(A11) In the example system of any of A1-A10, wherein the one or more processors are configured to assign the scores to the respective patterns in the Bayesian network using a classifier that is trained using features that are derived from labeled data, which represents the knowledge of the historical patterns and the historical security threats.

(B1) An example method of performing automatic graph-based detection of potential security threats, the method implemented by a computing system (FIG. 1, 102A-102M, 106A-106N; FIG. 3, 300; FIG. 7, 700), comprises initializing (FIG. 2, 202) a Bayesian network using an association graph, based on correlations among graph nodes that are included in the association graph, to establish connections among network nodes that are included in the Bayesian network. The method further comprises grouping (FIG. 2, 204) the network nodes of the Bayesian network among clusters that correspond to respective intents such that, for each connection between a respective pair of network nodes, which includes an arbitrary network node and a network node that is included in a cluster, a connection between the arbitrary network node and each of the other network nodes that are included in that cluster is created. The method further comprises identifying (FIG. 2, 206) a plurality of patterns in the Bayesian network, each pattern including at least one connection, each connection being between a respective pair of network nodes. The method further comprises removing (FIG. 2, 208) at least one redundant connection, which is redundant with regard to one or more other connections, from the patterns in the Bayesian network. The method further comprises assigning (FIG. 2, 210) scores to the respective patterns in the Bayesian network, based on knowledge of historical patterns and historical security threats, such that each score indicates a likelihood of the respective pattern to indicate a security threat. The method further comprises automatically generating (FIG. 2, 212) an output graph (FIG. 3, 342), which includes each pattern that has a score that is greater than or equal to a score threshold and which does not include each pattern that has a score that is less than the score threshold. Each pattern in the output graph represents a potential security threat.

(B2) In the method of B1, further comprising: generating the association graph based on information regarding a computer network, the information indicating requests that are received in the computer network, data that are accessed in response to the requests, and operations that are performed on the data.

(B3) In the method of any of B1-B2, wherein initializing the Bayesian network comprises: initializing the Bayesian network using the association graph based on pairwise correlations among the graph nodes that are included in the association graph.

(B4) In the method of any of B1-B3, wherein initializing the Bayesian network comprises: initializing the Bayesian network by performing a test of significance on the association graph to identify the correlations among the graph nodes in the association graph.

(B5) In the method of any of B1-B4, wherein initializing the Bayesian network comprises: assigning a weight to each pair of network nodes in the Bayesian network, each weight representing an extent to which the network nodes in the respective pair are related; and removing a connection between each pair of network nodes in the Bayesian network that has a weight that is less than or equal to a weight threshold.

(B6) In the method of any of B1-B5, wherein each graph node of the association graph represents an entity from a plurality of entities or an event from a plurality of events; and wherein each network node of the Bayesian network represents an event from the plurality of events.

(B7) In the method of any of B1-B6, wherein identifying the plurality of patterns in the Bayesian network comprises: automatically identifying a first subset of the plurality of patterns using a machine learning technique; and identifying a second subset of the plurality of patterns using a manually generated rule; and wherein each of the first subset and the second subset includes at least one pattern from the plurality of patterns.

(B8) In the method of any of B1-B7, further comprising: identifying redundant connections among the patterns in the Bayesian network by performing a conditional independence test on the network nodes of the Bayesian network, the conditional independence test configured to determine whether each network node in the Bayesian network has a causal relation to each other network node in the Bayesian network; wherein removing the at least one redundant connection comprises: removing the at least one redundant connection as a result of identifying the redundant connections among the patterns in the Bayesian network.

(B9) In the method of any of B1-B8, wherein identifying the redundant connections among the patterns in the Bayesian network comprises: automatically identifying a first subset of the redundant connections using a machine learning technique; and identifying a second subset of the redundant connections using a manually generated rule; and wherein each of the first subset and the second subset includes at least one of the redundant connections.

(B10) In the method of any of B1-B9, wherein removing at least one redundant connection comprises: removing a first connection, which is between a first network node and a second network node, from the patterns in the Bayesian network based on the first connection being redundant with regard to a second connection, which is between the first network node and a third network node, as a result of the second network node and the third network node being equivalent.

(B11) In the method of any of B1-B10, wherein assigning the scores comprises: assigning the scores to the respective patterns in the Bayesian network using a classifier that is trained using features that are derived from labeled data, which represents the knowledge of the historical patterns and the historical security threats.

(C1) An example computer program product (FIG. 7, 718, 722) comprising a computer-readable storage medium having instructions recorded thereon for enabling a processor-based system (FIG. 1, 102A-102M, 106A-106N; FIG. 3, 300; FIG. 7, 700) to perform automatic graph-based detection of potential security threats by performing operations. The operations comprise initializing (FIG. 2, 202) a Bayesian network using an association graph, based on correlations among graph nodes that are included in the association graph, to establish connections among network nodes that are included in the Bayesian network. The operations further comprise grouping (FIG. 2, 204) the network nodes of the Bayesian network among clusters that correspond to respective intents such that, for each connection between a respective pair of network nodes, which includes an arbitrary network node and a network node that is included in a cluster, a connection between the arbitrary network node and each of the other network nodes that are included in that cluster is created. The operations further comprise identifying (FIG. 2, 206) a plurality of patterns in the Bayesian network, each pattern including at least one connection, each connection being between a respective pair of network nodes. The operations further comprise removing (FIG. 2, 208) at least one redundant connection, which is redundant with regard to one or more other connections, from the patterns in the Bayesian network. The operations further comprise assigning (FIG. 2, 210) scores to the respective patterns in the Bayesian network, based on knowledge of historical patterns and historical security threats, such that each score indicates a likelihood of the respective pattern to indicate a security threat. The operations further comprise automatically generating (FIG. 2, 212) an output graph (FIG. 3, 342), which includes each pattern that has a score that is greater than or equal to a score threshold and which does not include each pattern that has a score that is less than the score threshold, each pattern in the output graph representing a potential security threat.

IV. Example Computer System

FIG. 7 depicts an example computer 700 in which embodiments may be implemented. Computer 700 may be a physical computer or a virtual computer (e.g., virtual machine). Any one or more of the protectable entities 102A-102M and/or the computing system 106 shown in FIG. 1 and/or the computing system 300 shown in FIG. 3 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 may include one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like. It will be recognized that external storage (e.g., cloud storage) and/or a cache may be used in addition to or in lieu of the hard disk drive 714, the magnetic disk drive 716, and/or the optical disk drive 720.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) the automatic graph-based detection logic 108, the automatic graph-based detection logic 308, the association graph logic 312, the initialization logic 314, the grouping logic 316, the pattern identification logic 318, the redundancy removal logic 320, the scoring logic 322, the output graph logic 324, and/or flowchart 200 (including any step of flowchart 200), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware.

Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to perform automatic graph-based detection of potential security threats, the system comprising:
   a memory; and
   one or more processors coupled to the memory, the one or more processors configured to:
      initialize a Bayesian network using an association graph, based on correlations among graph nodes that are included in the association graph, to establish connections among network nodes that are included in the Bayesian network;
      group the network nodes of the Bayesian network among clusters that correspond to respective intents such that, for each connection between a respective pair of network nodes, which includes an arbitrary network node and a network node that is included in a cluster, a connection between the arbitrary network node and each of the other network nodes that are included in that cluster is created;
      identify a plurality of patterns in the Bayesian network, each pattern including at least one connection, each connection being between a respective pair of network nodes;
      remove at least one redundant connection, which is redundant with regard to one or more other connections, from the patterns in the Bayesian network;
      assign scores to the respective patterns in the Bayesian network, based on knowledge of historical patterns and historical security threats, such that each score indicates a likelihood of the respective pattern to indicate a security threat; and
      automatically generate an output graph, which includes each pattern that has a score that is greater than or equal to a score threshold and which does not include each pattern that has a score that is less than the score threshold, each pattern in the output graph representing a potential security threat.

2. The system of claim 1, wherein the one or more processors are further configured to:
   generate the association graph based on information regarding a computer network, the information indicating requests that are received in the computer network, data that are accessed in response to the requests, and operations that are performed on the data.

3. The system of claim 1, wherein the one or more processors are configured to:
   initialize the Bayesian network using the association graph based on pairwise correlations among the graph nodes that are included in the association graph.

4. The system of claim 1, wherein the one or more processors are configured to:
   initialize the Bayesian network by performing a test of significance on the association graph to identify the correlations among the graph nodes in the association graph.

5. The system of claim 1, wherein the one or more processors are configured to:
   assign a weight to each pair of network nodes in the Bayesian network, each weight representing an extent to which the network nodes in the respective pair are related; and
   remove a connection between each pair of network nodes in the Bayesian network that has a weight that is less than or equal to a weight threshold.

6. The system of claim 1, wherein each graph node of the association graph represents an entity from a plurality of entities or an event from a plurality of events; and
   wherein each network node of the Bayesian network represents an event from the plurality of events.

7. The system of claim 1, wherein the one or more processors are configured to:
   automatically identify a first subset of the plurality of patterns using a machine learning technique; and
   identify a second subset of the plurality of patterns using a manually generated rule; and
   wherein each of the first subset and the second subset includes at least one pattern from the plurality of patterns.

8. The system of claim 1, wherein the one or more processors are configured to:
   identify redundant connections among the patterns in the Bayesian network by performing a conditional independence test on the network nodes of the Bayesian network, the conditional independence test configured to determine whether each network node in the Bayesian network has a causal relation to each other network node in the Bayesian network; and
   remove the at least one redundant connection as a result of identifying the redundant connections among the patterns in the Bayesian network.

9. The system of claim 8, wherein the one or more processors are configured to:
   automatically identify a first subset of the redundant connections using a machine learning technique; and
   identify a second subset of the redundant connections using a manually generated rule; and
   wherein each of the first subset and the second subset includes at least one of the redundant connections.

10. The system of claim 1, wherein the one or more processors are configured to:
    remove a first connection, which is between a first network node and a second network node, from the patterns in the Bayesian network based on the first connection being redundant with regard to a second connection, which is between the first network node and a third network node, as a result of the second network node and the third network node being equivalent.

11. The system of claim 1, wherein the one or more processors are configured to:
    assign the scores to the respective patterns in the Bayesian network using a classifier that is trained using features that are derived from labeled data, which represents the knowledge of the historical patterns and the historical security threats.

12. A method of performing automatic graph-based detection of potential security threats, the method implemented by a computing system, the method comprising:

initializing a Bayesian network using an association graph, based on correlations among graph nodes that are included in the association graph, to establish connections among network nodes that are included in the Bayesian network;

grouping the network nodes of the Bayesian network among clusters that correspond to respective intents such that, for each connection between a respective pair of network nodes, which includes an arbitrary network node and a network node that is included in a cluster, a connection between the arbitrary network node and each of the other network nodes that are included in that cluster is created;

identifying a plurality of patterns in the Bayesian network, each pattern including at least one connection, each connection being between a respective pair of network nodes;

removing at least one redundant connection, which is redundant with regard to one or more other connections, from the patterns in the Bayesian network;

assigning scores to the respective patterns in the Bayesian network, based on knowledge of historical patterns and historical security threats, such that each score indicates a likelihood of the respective pattern to indicate a security threat; and automatically generating an output graph, which includes each pattern that has a score that is greater than or equal to a score threshold and which does not include each pattern that has a score that is less than the score threshold, each pattern in the output graph representing a potential security threat.

13. The method of claim 12, further comprising:
generating the association graph based on information regarding a computer network, the information indicating requests that are received in the computer network, data that are accessed in response to the requests, and operations that are performed on the data.

14. The method of claim 12, wherein initializing the Bayesian network comprises:
initializing the Bayesian network by performing a test of significance on the association graph to identify the correlations among the graph nodes in the association graph.

15. The method of claim 12, wherein initializing the Bayesian network comprises:
assigning a weight to each pair of network nodes in the Bayesian network, each weight representing an extent to which the network nodes in the respective pair are related; and
removing a connection between each pair of network nodes in the Bayesian network that has a weight that is less than or equal to a weight threshold.

16. The method of claim 12, wherein each graph node of the association graph represents an entity from a plurality of entities or an event from a plurality of events; and
wherein each network node of the Bayesian network represents an event from the plurality of events.

17. The method of claim 12, further comprising:
identifying redundant connections among the patterns in the Bayesian network by performing a conditional independence test on the network nodes of the Bayesian network, the conditional independence test configured to determine whether each network node in the Bayesian network has a causal relation to each other network node in the Bayesian network;
wherein removing the at least one redundant connection comprises:
removing the at least one redundant connection as a result of identifying the redundant connections among the patterns in the Bayesian network.

18. The method of claim 12, wherein removing at least one redundant connection comprises:
removing a first connection, which is between a first network node and a second network node, from the patterns in the Bayesian network based on the first connection being redundant with regard to a second connection, which is between the first network node and a third network node, as a result of the second network node and the third network node being equivalent.

19. The method of claim 12, wherein assigning the scores comprises:
assigning the scores to the respective patterns in the Bayesian network using a classifier that is trained using features that are derived from labeled data, which represents the knowledge of the historical patterns and the historical security threats.

20. A computer program product comprising a computer-readable storage medium having instructions recorded thereon for enabling a processor-based system to perform automatic graph-based detection of potential security threats by performing operations, the operations comprising:
initializing a Bayesian network using an association graph, based on correlations among graph nodes that are included in the association graph, to establish connections among network nodes that are included in the Bayesian network;

grouping the network nodes of the Bayesian network among clusters that correspond to respective intents such that, for each connection between a respective pair of network nodes, which includes an arbitrary network node and a network node that is included in a cluster, a connection between the arbitrary network node and each of the other network nodes that are included in that cluster is created;

identifying a plurality of patterns in the Bayesian network, each pattern including at least one connection, each connection being between a respective pair of network nodes;

removing at least one redundant connection, which is redundant with regard to one or more other connections, from the patterns in the Bayesian network;

assigning scores to the respective patterns in the Bayesian network, based on knowledge of historical patterns and historical security threats, such that each score indicates a likelihood of the respective pattern to indicate a security threat; and automatically generating an output graph, which includes each pattern that has a score that is greater than or equal to a score threshold and which does not include each pattern that has a score that is less than the score threshold, each pattern in the output graph representing a potential security threat.

* * * * *